Aug. 17, 1965 K. W. PORTER ETAL 3,201,778

DIGITAL COMMUNICATION SYSTEM

Filed April 26, 1960

2 Sheets-Sheet 1

INVENTORS
Dwight L. Pringle
Kenneth W. Porter Jr.
BY Mueller & Aichele
Attorneys INVENTORS
Dwight L. Pringle
Kenneth W. Porter Jr.
BY Mueller & Aichele
Attorneys

3,201,778
DIGITAL COMMUNICATION SYSTEM

Kenneth W. Porter, Jr., and Dwight L. Pringle, Phoenix, Ariz., assignors to Motorola, Inc., Chicago, Ill., a corporation of Illinois Filed Apr. 26, 1960, Ser. No. 24,823
6 Claims. (Cl. 340—347)

This invention relates to digital storage registers, and it relates more particularly to an improved storage register which is capable of performing digital-to-analog conversions so as to provide an analog output signal representative of the values of digital signals introduced to the register.

The apparatus of the invention finds utility, for example, in data link systems in which information is transmitted to a vehicle in digital form. The apparatus of the invention is capable of receiving such digital information and of converting the received information into an analog quantity for use by the vehicle.

It is usual in the prior art to decode the received digital messages and to transform such messages into an equivalent analog voltage or current. Such a conversion provides an output signal which is appropriate for readings by a meter or oscilloscope, or for additional processing by suitable analog circuits. The improved apparatus and system of the invention, unlike the prior art systems referred to above, is capable of converting such received digital messages into analog phase information. Such phase information can be used in phase-sensitive detectors or resolver circuits to provide desired readings or controls. The conversion of the received digital messages into analog phase information is particularly useful, for example, in aircraft carrying airborne computers. In this particular use, the digital messages often are used to transmit heading or bearing angle information to the aircraft, and such information is most conveniently represented by phase designations.

It is, accordingly, an object of the present invention to provide an improved system which is capable of storing digital information introduced thereto and of converting such digital information in a simplified manner into analog output information of a type finding direct utility in many applications.

Another object of the invention is to provide such an improved system which is relatively simple in its construction, and which may be constructed in the form of a relatively compact, light and space-saving unit so as to be well suited, for example, for airborne uses.

A feature of the invention is the provision of an improved and simplified digital-analog conversion system in which received digital information is stored and converted into an output signal, the output signal having a phase relation with respect to a reference signal which is essentially a linear function of the binary number represented by the received digital information.

The above and other features of the invention which are believed to be new are set forth in the claims. The invention itself, however, together with further objects and advantages thereof may best be understood by reference to the following specification and taken in conjunction with the accompanying drawings in which:

Figure 1:
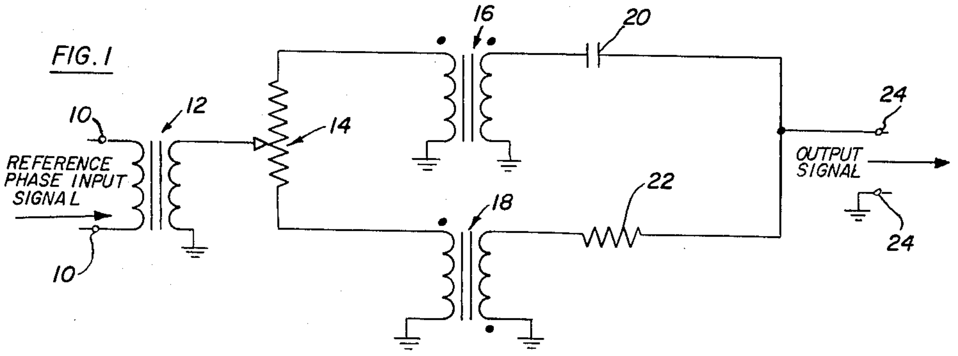
FIGURE 1 is a schematic circuit representation which is useful in explaining the principles underlying the invention.

The circuit of FIGURE 1 includes a pair of input terminals 10 to which a reference signal is applied. This reference signal may have a predetermined frequency. The input terminals 10 are connected to the primary winding of a transformer 12. The secondary winding of the transformer 12 is connected to a point of reference potential, such as ground, and to the armature of a potentiometer 14. This potentiometer has a resistance (R).

One terminal of the potentiometer 14 is connected to the primary winding of a transformer 16, and the other terminal of the potentiometer is connected to the primary winding of a transformer 18. The other terminal of the primary windings of the transformers 16 and 18 are grounded.

The secondary winding of the transformer 16 is connected to ground and to a capacitor 20. The capacitor 20 may have a capacity ($C_1$). The secondary winding of the transformer 18 is connected to ground and to a resistor 22. The resistor 22 may have a resistance ($R_1$). The windings of the transformers 16 and 18 are wound with a relative polarity indicated by the dots adjacent the windings.

The capacitor 20 and the resistor 22 are connected together and to one of a pair of output terminals 24, the other output terminal being grounded. An output signal is developed across the output terminals 24. This output signal has the frequency of the reference phase input signal, and has a controllable phase relation therewith, as will be explained.

The system and circuitry of the invention, as noted above, provide a convenient means for converting digital messages into analog quantities, the resulting analog quantities taking the form of a phase-analog signal. As also noted, this phase-analog signal has a phase relationship with a particular reference signal which bears a particular relationship to the binary numbers contained in the received digital messages.

More specifically, the system of the invention includes a combination of a digital register in which a received digital message may be stored, and a phase-shifting network coupled to the register and controlled thereby to convert the binary number stored in the register at any particular time into a phase-analog output signal. The phase relationship of the phase-analog output signal with a particular reference phase input signal is essentially a linear function of the magnitude of the binary number stored in the register.

In the circuit representation of FIGURE 1, the potentiometer 14 is under the control of a digital register, not shown, so that its armature is moved in accordance with the binary number stored in the register. This potentiometer 14, in turn, controls the relative magnitude of the currents introduced to the primary windings of the transformers 16 and 18. The secondary windings of these transformers are connected to a phase-shifting network formed by the capacitor 20 and the resistor 22. These elements are chosen so that $$\frac{1}{1\pi f C_1}=R_1 \qquad (1)$$

where:

$C_1$ is the capacity of the capacitor 20;
$R_1$ is the resistance of the resistor 22;
$f$ is the frequency of the reference phase input signal.

It is evident, therefore, that the phase angle of the output signal produced across the output terminals 24 with respect to the reference phase input signal introduced across the input terminals 10 is controlled by the setting of the armature of the potentiometer 14. This armature, as mentioned above, is set in accordance with the magnitude of the binary number stored in the digital register.

Figure 2:
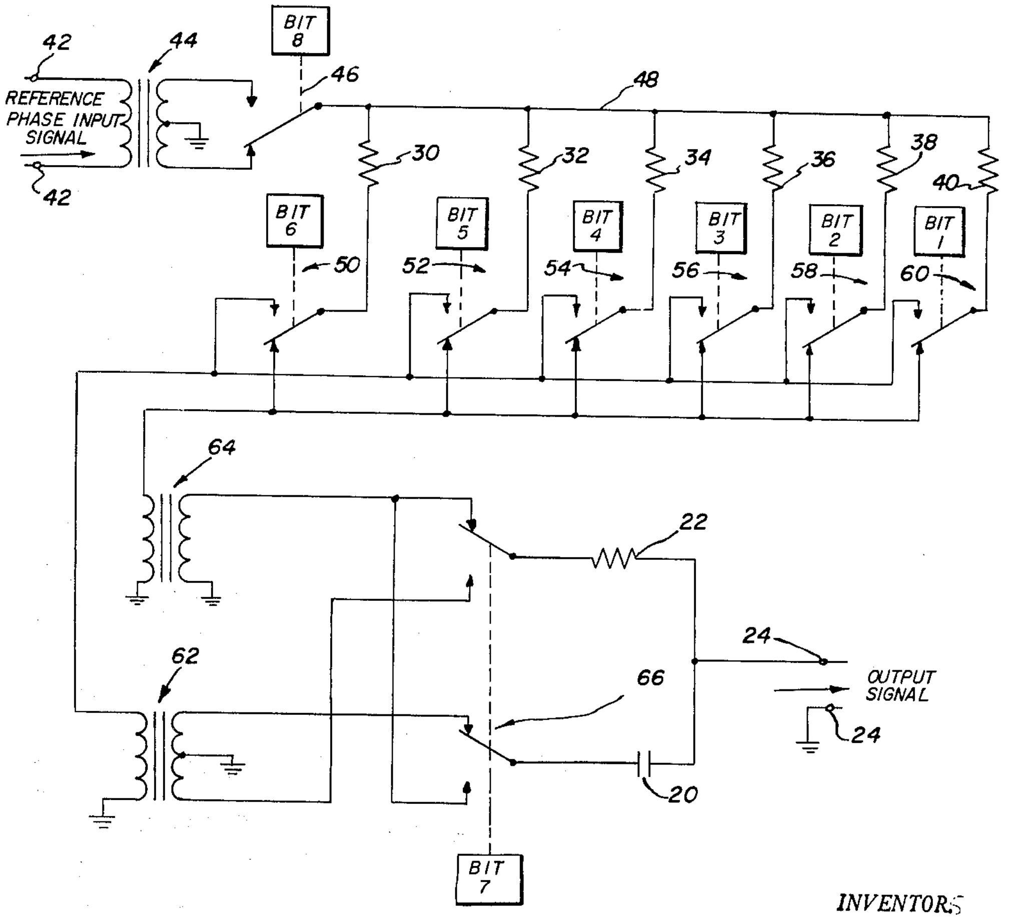
FIGURE 2 is a circuit diagram illustrating one form which the system of the invention may take.

In the system of FIGURE 2, the potentiometer 14 is substituted by a plurality of resistors 30, 32, 34, 36, 38 and 40. These resistors are selectively switched in and out of the phase-shifting circuit under the control of the storage register. The resistors are arranged to have values corresponding to the binary code, and they correspond to an 8-bit digital message, for purposes of the present description. It will be evident as the description proceeds, that more or less resistors may be used depending upon the resolution desired. In the illustrated embodiment, the resistor 30 has a resistance $2^0 \cdot R$, the resistor 32 has a resistance $2^1 \cdot R$, the resistor 34 has a resistance $2^2 \cdot R$, the resistor 36 has a resistance $2^3 \cdot R$, the resistor 38 has a resistance $2^4 \cdot R$, and the resistor 40 has a resistance of $2^5 \cdot R$.

The reference phase input signal is introduced to a pair of input terminals 42, and these input terminals are connected to the primary winding of a transformer 44. The secondary winding of the transformer 44 has a center tap connected to a point of reference potential, such as ground. One side of the secondary winding is connected to a normally open contact of a relay 46, and the other side of the secondary winding is connected to a normally closed contact of that relay. The armature of the relay 46 is connected to a common lead 48. Each of the resistors 30, 32, 34, 36, 38 and 40 is connected to the common lead 48. The resistor 30 is connected to the armature of a relay 50, the resistor 32 is connected to the armature of a relay 52, the resistor 34 is connected to the armature of a relay 54, the resistor 36 is connected to the armature of a relay 56, the resistor 38 is connected to the armature of a relay 58, and the resistor 40 is connected to the armature of a relay 60.

A normally open contact of each of the relays 50, 52, 54, 56, 58 and 60 is connected to one side of the primary winding of a transformer 62, the other side of that primary winding being connected to the point of reference potential. Each of the relays has a normally closed contact which is connected to the primary winding of a transformer 64, this primary winding, likewise, being connected to the point of reference potential.

The secondary winding of the transformer 62 has a center tap connected to the point of reference potential. One side of that secondary winding is connected to a first normally closed contact of a relay 66. The other side of that secondary winding is connected to a second normally open contact of the relay 66. The secondary winding of the transformer 64 is connected to ground, and that secondary winding is connected to a first normally open contact of the relay 66 and to a second normally closed contact of that relay. A first armature of the relay 66 is connected to the capacitor 20 in the phase-shifting network, and a second armature of that relay is connected to the resistor 22 in that network. The phase-shifting network, as in the circuit of FIGURE 1, is connected to the output terminals 24.

The relays 46, 50, 52, 54, 56, 58, 60 and 66 are controlled by a digital register. The control is such that when a corresponding bit in the register is a binary "1" the particular relay is assumed to be energized. Conversely, when the corresponding bit in the register is a binary "0," the particular relay is de-energized. In the system of FIGURE 2, the least significant bit in the register is assumed to control the relay 60, the next least significant bit is assumed to control the relay 58, the next least significant bit is assumed to control the relay 56, the next least significant bit is assumed to control the relay 54, the next least significant bit is assumed to control the relay 52, the next least significant bit is assumed to control the relay 50, the next least significant bit is assumed to control the relay 66, and the most significant bit is assumed to control the relay 46.

The system of FIGURE 2 is capable of providing a 360 degree rotation of the phase of the output signal across the terminals 24 with respect to the reference phase input signal, this being achieved under the control of the 8-bit digital messages in the register. The values of the resistors 30, 32, 34, 36, 38 and 40 are chose, as described above, to have relative values such that if the resistor 30 is considered to have a resistance R the resistor 32 has a resistance 2R, the resistor 34 has a resistance 4R, the resistor 36 has a resistance 8R, the resistor 38 has a resistance 16R, and the resistor 40 has a resistance of 32R. The arrangement is such, as mentioned above, that if the least significant digit of the stored 8-bit digital message is a "1," the relay 60 is energized to change the connection of the resistor 40 from the transformer 64 to the transformer 62. In like manner, when the second least significant digit is a "1," the relay 58 is energized to change the connection of the resistor 38 from the transformer 64 to the transformer 62, and so on.

In the manner described above, the first six bits of the 8-bit binary message stored in the digital register provide successive phase shifts of the output signal with respect to the reference phase input signal, these successive phase shifts extending through 88.6 degrees. If the seventh bit of the message stored in the digital register is a "1," the relay 66 becomes energized. The energizing of the relay 66 reverses the phase of the secondary voltage derived from the transformer 62 and reverses the connections from the transformers 62 and 64 to the resistor 22 and capacitor 20. The phase of the output signal with respect to the reference phase input signal is then placed in the third and fourth quadrants if the eighth bit of the message stored in the digital register is a "1." When that occurs, the relay 46 is energized, and the energizing of that relay reverses the phase of the votage derived from the secondary winding of the excitation transformer 44.

To further explain the division of current between the transformers 64 and 62, an 8-bit binary message in the digital register composed entirely of 0's will first be considered. For such a message, all the relays 46, 50, 52, 54, 56, 58, 60 and 66 are de-energized, and the current through the primary winding of the transformer 64 is a maximum and the current through the primary winding of the transformer 62 is zero. Now, if the least significant digit of the message stored in the digital register is a "1," the relay 60 becomes energized to switch the resistor 40 from the transformer 64 to the transformer 62. Current now flows in the primary winding of the transformer 62, and the current flow in the primary winding of the transformer 64 is reduced. The resulting flow of current through the capacitor 20 causes the phase of the output signal with respect to the input signal to advance an amount corresponding to the magnitude of the binary number now represented by the digital message in the register.

For an 8-bit message, for example, the desired phase advance is 360/255 or 1.412 degrees for each unity bit change in the message. The resistor 40 is shown to have a resistance 32R, and that value is appropriate to produce such an advance.

As is well known, in accordance with the binary system principles, each bit of the received 8-bit message, progressing from the least significant bit to the most significant bit, carries twice the significance of the bit it precedes. Therefore, the second least significant bit must control twice as much current as the least significant bit, and so on. It is for that reason that the resistors 30, 32, 34, 36, 38 and 40 have the values mentioned above.

Therefore, if the second least significant bit of the 8-bit binary message in the digital register is a "1," the relay 58 is energized to switch the resistor 38 from the transformer 64 to the transformer 62. The resulting increase in current in the transformer 62 and decrease of current in the transformer 64 is twice that caused by the energizing of the relay 60 by the least significant bit. The phase advance of the output signal with respect to the input signal is also twice that caused by the least significant bit.

In like manner, the phase of the output signal with respect to the input signal is advanced under the control of the succeeding bits of the message stored in the digital register. In the illustrated system, the phase difference between the output signal and the input signal is essentially a linear function of the magnitude of the binary number represented at any instant by the received digital message.

Figure 3:
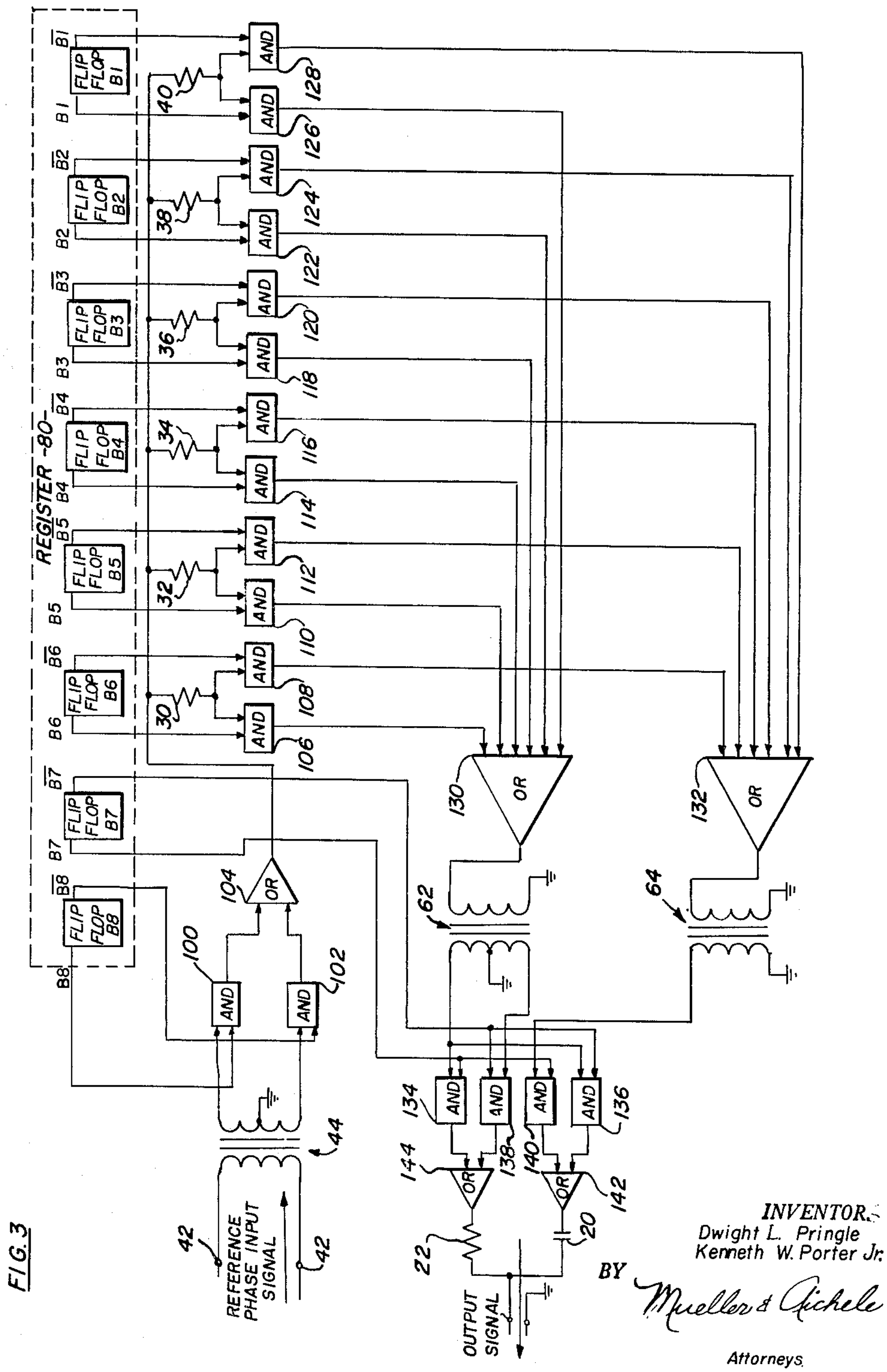
FIGURE 3 is a circuit diagram of a more practical and commercial embodiment of the invention.

In the system of FIGURE 3, the relays of FIGURE 2 have been replaced by usual "and" gates and "or" gates. These gates are well known to the electronic digital computer and related arts. An "and" gate produces an output term which is true only when all its input terms are true. An "or" gate, on the other hand, produces an output term which is true when any of its input terms are true. These gates may be formed with any known circuit configuration, and a detailed description of the appropriate circuitry is believed unnecessary for purposes of the present description.

The digital storage register is designated 80 in the system of FIGURE 3, and it is illustrated as including a plurality of flip-flop networks. These networks are also well known to the electronic digital computer and related arts. A flip-flop network is a bi-stable circuit, and it may be triggered to a "true" state or to a "false" state by appropriate input triggering signals. Whenever the flip-flop is triggered to one of its two states, it will remain in that state until returned to its original state by a succeeding input signal.

In the system of FIGURE 3, the secondary winding of the transformer 44 is connected to an "and" gate 100 and to an "and" gate 102. These "and" gates are connected to an "or" gate 104, and the output terminal of the "or" gate is connected to the common lead 48. The resistors 30, 32, 34, 36, 38 and 40 are all connected to the common lead 48, as described above.

The resistor 30 is connected to an "and" gate 106 and to an "and" gate 108. The resistor 32 is connected to an "and" gate 110 and to an "and" gate 112. The resistor 34 is connected to an "and" gate 114 and to an "and" gate 116. The resistor 36 is connected to an "and" gate 118 and to an "and" gate 120. The resistor 38 is connected to an "and" gate 122 and to an "and" gate 124. The resistor 40 is connected to an "and" gate 126 and to an "and" gate 128.

The "and" gates 106, 110, 114, 118, 122 and 126 are all connected to an "or" gate 130. The "and" gates 108, 112, 116, 120, 124 and 128 are all connected to an "or" gate 132. The "or" gate 132 is connected to the primary winding of the transformer 64, and the "or" gate 130 is connected to the primary winding of the transformer 62. The secondary of the transformer 64 is connected to an "and" gate 134 and to an "and" gate 136. One side of the secondary of the transformer 62 is connected to an "and" gate 138, and the other side of the secondary is connected to an "and" gate 140.

The "and" gates 134 and 138 are connected to an "or" gate 142, and the "and" gates 136 and 140 are connected to an "or" gate 144. The "or" gate 142 is connected to the resistor 22 in the phase-shifting network and the "or" gate 144 is connected to the capacitor 20 in that network.

The digital storage register is shown as including a plurality of flip-flops B1, B2, B3, B4, B5, B6, B7 and B8. However, it will be understood that any suitable digital register of any known type may be used. In the illustrated register, the received digital message is stored in the flip-flops by suitable logic circuitry. This logic circuitry may be of any known type, and is not shown herein. The least significant bit of the received message is stored in the flip-flop B1, the next least significant bit is stored in the flip-flop B2 and so on, the most significant bit being stored in the flip-flop B8. When a bit of the stored message is a "1," its corresponding flip-flop is triggered true. Conversely, when a bit of the stored message is a "0," its corresponding flip-flop is triggered false.

Each of the flip-flops of the register is illustrated as including a true output terminal and a false output terminal. The flip-flop B1, for example, has a true output terminal B1 connected to an input terminal of the "and" gate 126, and it has a false output terminal $\overline{B1}$ connected to the "and" gate 128. When the flip-flop B1 is set true, the "and" gate 126 is enabled; and when the flip-flop B1 is set false, the "and" gate 128 is enabled.

In like manner, the flip-flop B2 has a true output terminal B2 connected to the "and" gate 122, and it has a false output terminal $\overline{B2}$ connected to the "and" gate 124. The flip-flop B3 has a true output terminal B3 connected to the "and" gate 118, and it has a false output terminal $\overline{B3}$ connected to the "and" gate 120. The flip-flop B4 has a true output terminal B4 connected to the "and" gate 114, and it has a false output terminal $\overline{B4}$ connected to the "and" gate 116. The flip-flop B5 has a true output terminal B5 connected to the "and" gate 110, and it has a false output terminal $\overline{B5}$ connected to the "and" gate 112. The flip-flop B6 has a true output terminal B6 connected to the "and" gate 106, and it has a false output terminal $\overline{B6}$ connected to the "and" gate 108. The flip-flop B7 has a true output terminal B7 connected to the "and" gates 134 and 140, and it has a false output terminal $\overline{B7}$ connected to the "and" gates 136 and 138. Finally, the flip-flop B8 has a true output terminal B8 connected to the "and" gate 100, and it has a false output terminal $\overline{B8}$ connected to the "and" gate 102.

The system of FIGURE 3 functions in the same manner as the system of FIGURE 2. When, for example, the message in the digital register 80 is all 0's, the flip-flops B1–B8 are all set false. This causes the "and" gates 108, 112, 116, 120, 124 and 128 to be enabled; and it causes the "and" gates 106, 110, 114, 118, 122 and 126 to be disabled. This causes maximum current to flow in the transformer 64 and zero current to flow in the transformer 62. The output signal is therefore in phase with the reference phase input signal for this condition.

Now, should the least significant bit of the stored message be a "1," the flip-flop B1 is set true. This causes the "and" gate 126 to be enabled, and the "and" gate 128 to be disabled. The current flow through the resistor 40 now flows in the primary winding of the transformer 62, instead of in the primary winding of the transformer 64. This causes a portion of the current to flow through the capacitor 20, so as to advance the phase of the output signal. In like manner, the flip-flops in the register 80 control the current flow through the transformers 62 and 64 in the same manner as the relays of FIGURE 2 controlled that current flow. The flip-flop B7 serves to reverse the connections of the transformers 62 and 64 under the control of the seventh bit to provide a corresponding advance in the phase of the output signal. This advance is derived, as explained above, by reversing the phase of the secondary voltage derived from the transformer 62 and reversing the connections to the resistor 22 and capacitor 20.

Likewise, under the control of the eighth bit of the message stored in the digital register 80, the "and" gates 100 and 102 reverse the phase of the voltage derived from the excitation transformer 44 to place the system in the third and fourth quadrants.

In the manner explained, therefore, the present invention provides a simple digital storage register assembly in which received digital messages may be stored and subsequently converted to analog quanjtities. The conversion practiced by the improved system of the present invention is on a phase relationship basis. As explained, the system functions to produce an output signal whose phase relation with a reference phase input signal is a linear function of the digital message stored in the register.

We claim:

1. A system for converting digital information into equivalent analog information including in combination: input circuit means for receiving a reference input signal, output circuit means for producing an output signal in response to such input signal and including a first path and a second path, said first path including means shifting the phase of the current therein relative to the phase of the current in said second path, means for combining the currents in said first and second paths to form an output signal having a phase relative to said input signal determined by the relative magnitudes of the current flow in said first and second paths, a plurality of resistors connected to a common input terminal which is connected to said input circuit means, said resistors each having an output terminal with the values of resistance between said input terminal and said output terminals varying in accordance with a binary code, control means coupled to said output terminals of said resistors and actuable for selectively connecting said output terminals to said first path and to said second path of said output circuit means, said control means applying current from said resistors to said first and second paths and controlling the relative magnitudes of the current flow in said first and second paths, and means for receiving digital information coupled to said control means to actuate said control means in accordance with the magnitude of the binary number represented by the received digital information at any instant.

2. A system in accordance with claim 1 wherein said first path includes a capacitor and said second path is resistive, with said capacitor shifting the phase of the current in said first path relative to the phase of the current in said second path.

3. A system for receiving digital information and for converting the digital information into equivalent analog information including in combination: input circuit means for receiving a reference input signal and including a first transformer having a primary winding and a secondary winding, output circuit means for producing an output signal in response to such input signal and including a second transformer having a primary winding and a secondary winding and a third transformer having a primary winding and a secondary winding, said output circuit means including resistance means and means connecting said secondary winding of said second transformer to said resistance means for applying signals thereto, said output circuit means further including capacitance means and means connecting said secondary winding of said third transformer to said capacitance means for applying signals thereto, said capacitance means shifting the phase of the current therein relative to the phase of the current in said resistive means, means for combining the currents in said capacitance means and said resistance means to form an output signal having a phase relative to said input signal determined by the relative magnitudes of the current flow in said resistance means and said capacitance means, a plurality of resistors having relative resistance values corresponding to a binary code, means for connecting each of said resistors to secondary winding of said first transformer, control means connected to said resistors and actuable for selectively connecting individual ones of said resistors to said primary winding of said second transformer and to said primary winding of said third transformer, register means for receiving and storing digital information, and means coupled to said register means and to said control means for actuating said control means in accordance with the magnitude of the binary number represented by the digital information stored in said register means.

4. A system for receiving digital information and for converting the digital information into equivalent analog information including in combination: input circuit means for receiving a reference input signal and including a first transformer having a primary winding and a secondary winding with a first side and a second side and with a center tap thereon connected to a point of reference potential, output circuit means for producing an output signal in response to such input signal and including resistance means and capacitance means, said capacitance means shifting the phase of the current therein relative to the phase of the current in said resistance means, means for combining the currents in said capacitance means and said resistance means to form an output signal having a phase relative to said input signal determined by the relative magnitudes of the current flow in said resistance means and said capacitance means, a plurality of resistors having relative resistance values corresponding to a binary code, first control means connected to said plurality of resistors and actuable for connecting said plurality of resistors selectively to said first and second sides of said secondary winding, second control means connected to said resistors and actuable for connecting selected ones of said resistors to said resistance means and selected ones of said resistors to said capacitance means, register means for receiving and storing multi-bit digital information, and actuating means coupled to said register means and to said first and second control means for actuating said first and second control means in accordance with the respective values of the individual bits of the binary number represented by the multi-bit digital information stored in said register means.

5. The combination defined in claim 4 and in which said actuating means actuates said first control means in accordance with the value of a particular one of the individual bits of such binary number.

6. A system for receiving digital information and for converting the digital information into equivalent analog information including in combination: input circuit means for receiving a reference input signal, output circuit means for producing an output signal in response to such input signal and including a first transformer having a primary winding and a secondary winding and a second transformer having a primary winding and a secondary winding with a first side and a second side and with a center tap connected to a point of reference potential, said output circuit means further including resistance means and capacitance means and said capacitance means shifting the phase of the current therein relative to the phase of the current in said resistance means, means for combining the currents in said capacitance means and said resistance means to form an output signal having a phase relative to said input signal determined by the relative magnitudes of the current flow in said resistance means and said capacitance means, a plurality of resistors having relative resistance values corresponding to a binary code, means for connecting each of said resistors to said input circuit means, first control means connected to said resistors and actuable for selectively connecting individual ones of said resistors to said primary winding of said first transformer and to said primary winding of said second transformer, said output circuit means including second control means connected to said secondary winding of said first transformer, said first and second sides of said secondary winding of said second transformer, said resistance means and said capacitance means, said second control means including means for selectively connecting said resistance means and said capacitance means to said secondary winding of said first transformer and to said first and second sides of said secondary winding of said second transformer, register means for receiving and storing multi-bit digital information, and means coupled to said register means and to said first and second control means for actuating said first and second control means in accordance with the respective values of the individual bits of the binary number represented by the multi-bit digital information stored in said register means.

References Cited by the Examiner

UNITED STATES PATENTS

| | | | |
|---|---|---|---|
| 2,411,423 | 11/46 | Guptill | 323—123 |
| 2,794,948 | 6/57 | Thompson et al. | 323—122 |
| 2,853,699 | 9/58 | O'Neil | 340—347 |
| 2,943,248 | 6/60 | Ritchey | 340—347 |

MALCOLM A. MORRISON, *Primary Examiner.*

IRVING L. SRAGOW, DARYL W. COOK, *Examiners.*